(12) United States Patent
Kimata et al.

(10) Patent No.: US 12,087,165 B2
(45) Date of Patent: Sep. 10, 2024

(54) MOVING BODY PREDICTION DEVICE, TRAFFIC SAFETY SUPPORT SYSTEM, AND STORAGE MEDIUM

(71) Applicants: HONDA MOTOR CO., LTD., Tokyo (JP); Honda Research Institute Europe GmbH, Offenbach/Main (DE)

(72) Inventors: Akihito Kimata, Saitama (JP); Tim Puphal, Offenbach/Main (DE); Ryohei Hirano, Saitama (JP); Masaki Okumoto, Saitama (JP); Yuji Takagi, Saitama (JP)

(73) Assignees: HONDA MOTOR CO., LTD, Tokyo (JP); Honda Research institute Europe Gmbh, Offenbach/Main (DE)

( * ) Notice: Subject to any disclaimer, the term of this patent is extended or adjusted under 35 U.S.C. 154(b) by 230 days.

(21) Appl. No.: 17/936,857

(22) Filed: Sep. 30, 2022

(65) Prior Publication Data
US 2024/0112582 A1 Apr. 4, 2024

(51) Int. Cl.
| | |
|---|---|
| G06V 20/58 | (2022.01) |
| G06T 7/20 | (2017.01) |
| G06T 7/70 | (2017.01) |
| G06V 20/59 | (2022.01) |
| G08G 1/16 | (2006.01) |

(52) U.S. Cl.
CPC ............... *G08G 1/166* (2013.01); *G06T 7/20* (2013.01); *G06T 7/70* (2017.01); *G06V 20/58* (2022.01); *G06V 20/597* (2022.01); *G08G 1/164* (2013.01); *G06T 2207/30201* (2013.01); *G06T 2207/30261* (2013.01); *G06T 2207/30268* (2013.01)

(58) Field of Classification Search
CPC .......... G08G 1/166; G08G 1/164; G06T 7/70; G06T 7/20; G06T 2207/30201; G06T 2207/30261; G06T 2207/30268; G06V 20/58; G06V 20/597
See application file for complete search history.

(56) References Cited

FOREIGN PATENT DOCUMENTS

| | | |
|---|---|---|
| JP | 2011118723 A | 6/2011 |
| JP | 2019053377 A | 4/2019 |

*Primary Examiner* — Mathew Franklin Gordon
(74) *Attorney, Agent, or Firm* — CKC & PARTNERS CO., LLC

(57) ABSTRACT

A predictor 62 predicts a future of a prediction target in a monitoring area. The predictor 62 includes a movement state information acquirer 620 configured to acquire movement state information, a surrounding state information acquirer 621 configured to acquire surrounding state information regarding movement states of traffic participants around the prediction target, a confirmation state information acquirer 623 configured to acquire confirmation state information regarding a surrounding confirmation state of a driver of the prediction target, a moving speed predictor 624 configured to predict a future moving speed of the prediction target on a basis of the movement state information, the surrounding state information, and the confirmation state information, and a collision predictor 625 configured to predict whether or not a collision will occur in a future of the prediction target on the basis of the movement state information, the surrounding state information, and the future moving speed.

14 Claims, 10 Drawing Sheets

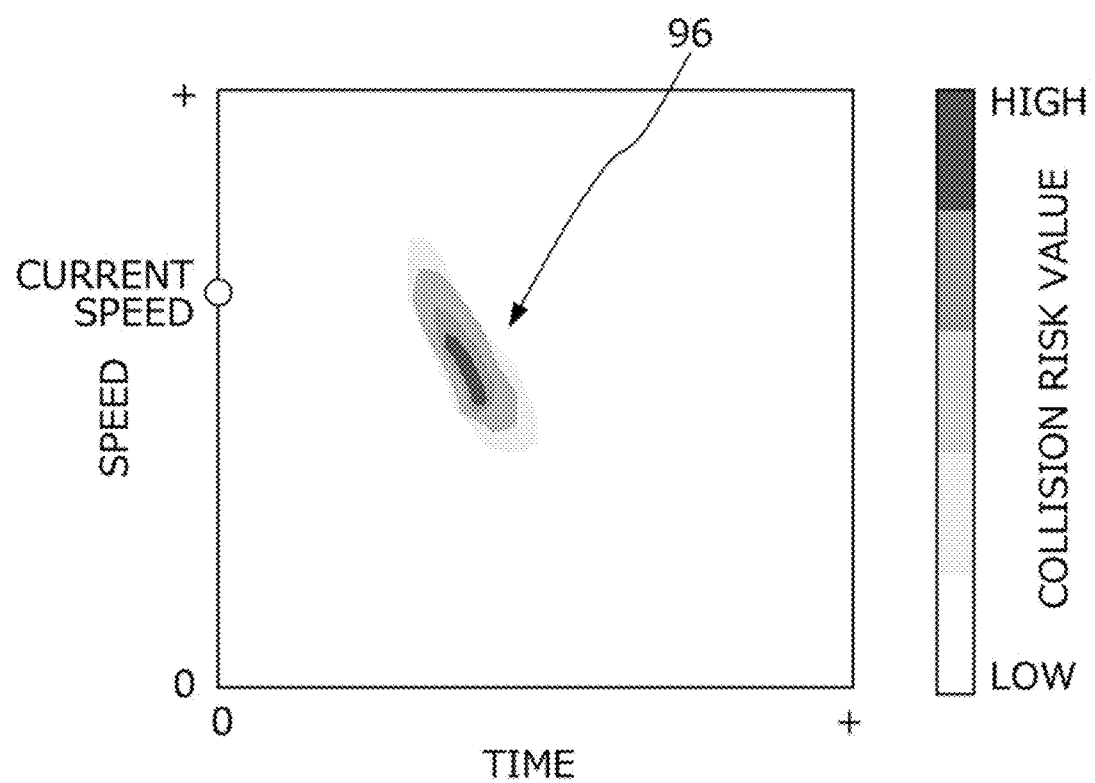

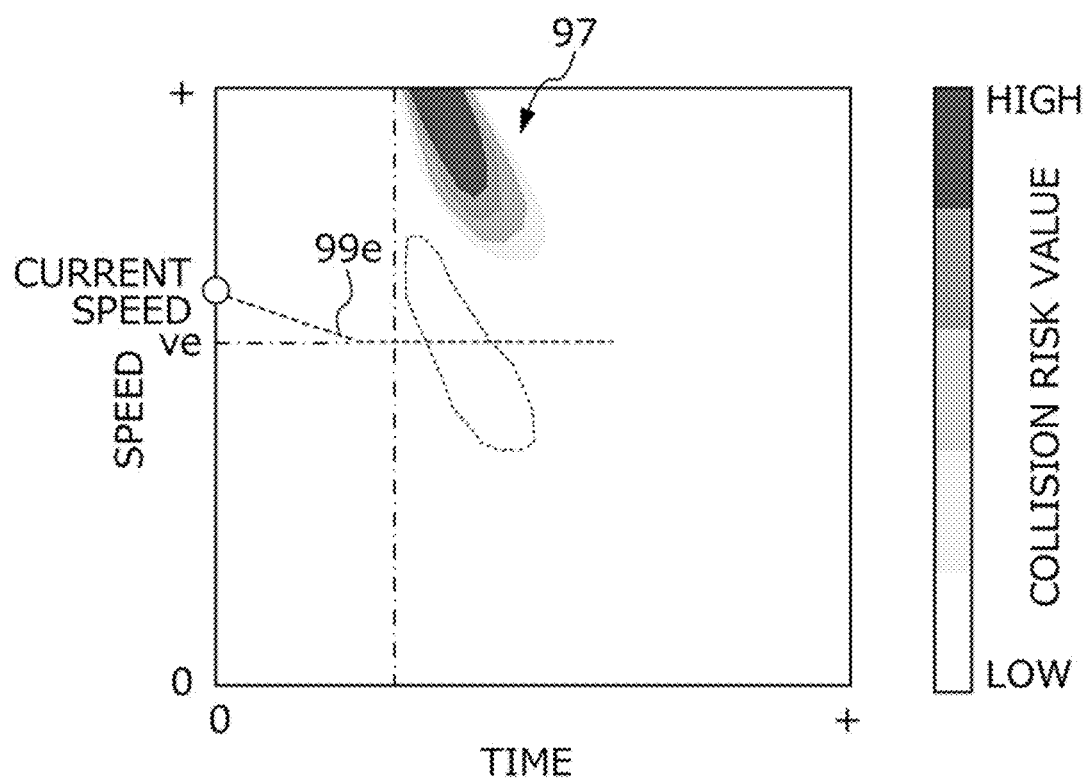

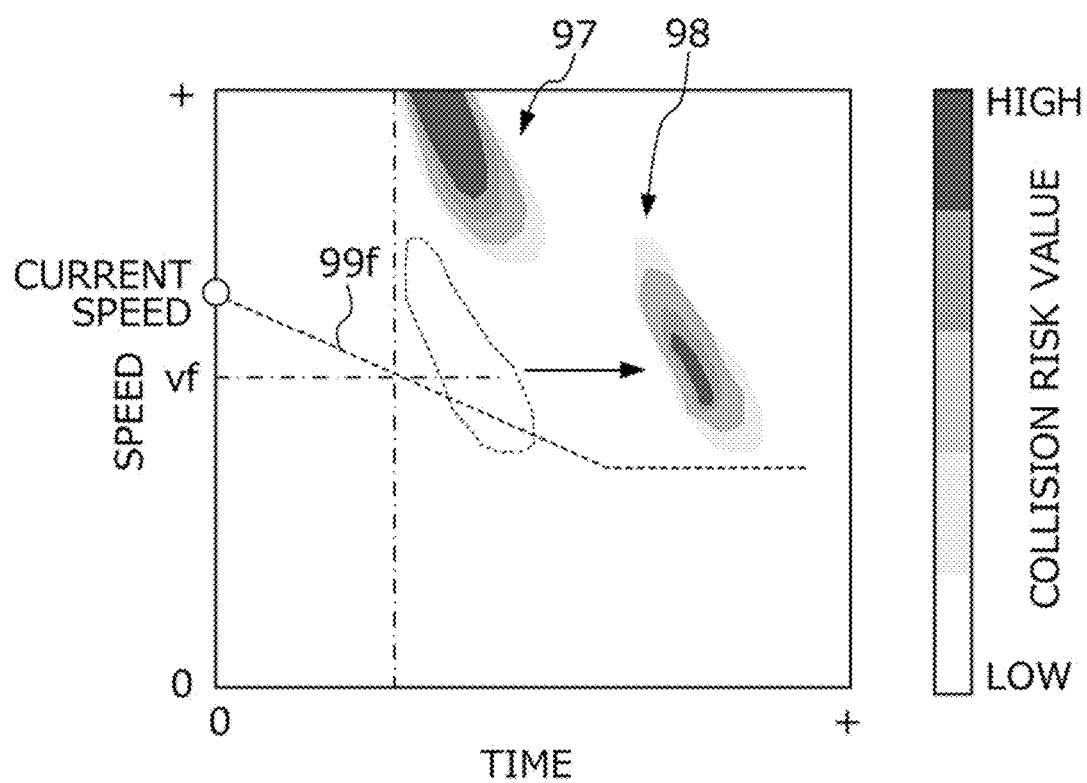

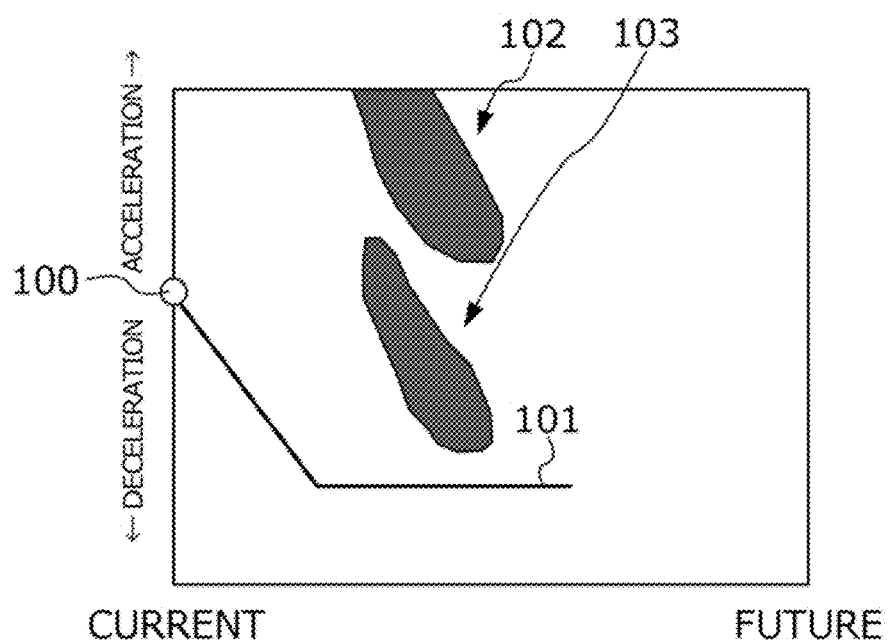

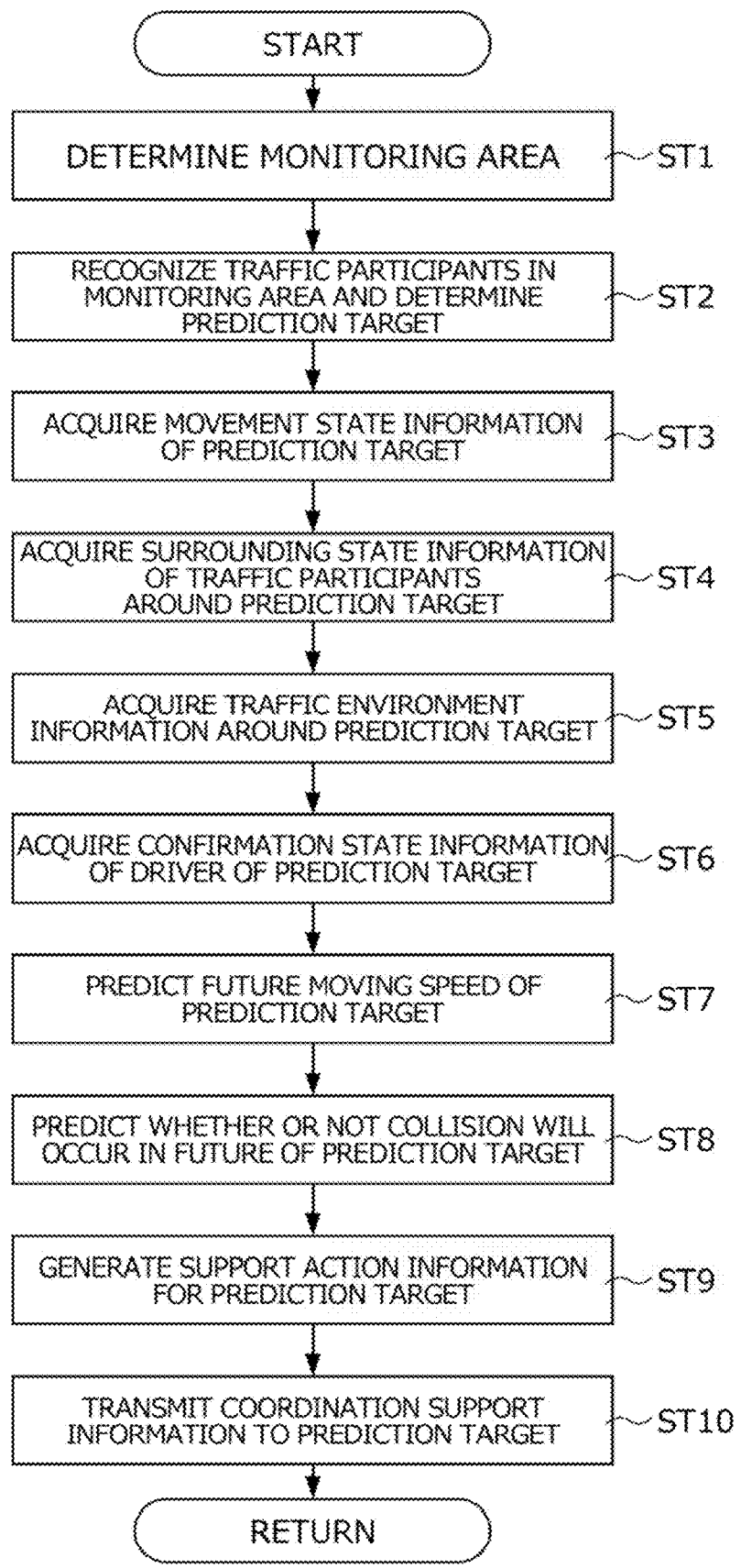

MOVING BODY PREDICTION DEVICE, TRAFFIC SAFETY SUPPORT SYSTEM, AND STORAGE MEDIUM

BACKGROUND OF THE INVENTION

Field of the Invention

The present invention relates to a moving body prediction device, a traffic safety support system, and a storage medium. More specifically, the present invention relates to a moving body prediction device that predicts futures of moving bodies in a traffic area, a traffic safety support system that includes the moving body prediction device, and a storage medium.

Related Art

In public traffic, various traffic participants such as moving bodies including four-wheeled vehicles, motorcycles, bicycles, and the like, and pedestrians move at different speeds on the basis of individual intentions. In recent years, there have been proposed various techniques for improving safety, convenience, and the like of traffic participants in such public traffic (for example, see Patent Documents 1 and 2).

A collision avoidance device disclosed in Patent Document 1 estimates a haste degree of a driver on the basis of a traveling state of a vehicle when the vehicle temporarily stops, and estimates acceleration when the vehicle starts to move, on the basis of the haste degree. The collision avoidance device determines a collision possibility with a moving object that is approaching the vehicle, on the basis of the estimated acceleration, and actuates an operation (e.g., notification to a driver) for avoiding a collision on the basis of a result of the determination.

As in the invention disclosed in Patent Document 1, in order to actuate the operation for avoiding a collision at appropriate timing, it is necessary to predict previously future action of the vehicle with high precision by using a vehicle action prediction device as disclosed in Patent Document 2, for example. In the vehicle action prediction device disclosed in Patent Document 2, the future action of the vehicle is predicted using a neural network previously trained to output vehicle information in the future from past image information and past vehicle information.

Patent Document 1: Japanese Unexamined Patent Application, Publication No. 2011-118723
Patent Document 2: Japanese Unexamined Patent Application, Publication No. 2019-53377

SUMMARY OF THE INVENTION

By the way, a driver who is a person recognizes surrounding conditions basically visually, and performs a driving operation on the basis of a result of the recognition. Therefore, the recognition result of the driver may be different from a recognition result obtained objectively by an on-board sensing device such as an on-board camera and an on-board radar. However, in the conventional vehicle action prediction device, the future action of the vehicle is predicted on the basis of the information obtained objectively in the same manner as the device disclosed in the above-described Patent Document 2, which makes it impossible to reflect the result of the recognition by the driver to the prediction result, resulting in a decrease in prediction precision.

The present invention is directed to providing a moving body prediction device capable of estimating a future of a moving body while reflecting a state of recognition of surroundings by a driver of the moving body, a traffic safety support system, and a storage medium.

(1) A moving body prediction device according to the present invention predicting, when a moving body moving in a traffic area is defined as a prediction target, a future of the prediction target in the traffic area, includes a movement state information acquirer configured to acquire movement state information regarding a movement state of the prediction target, a surrounding state information acquirer configured to acquire surrounding state information regarding movement states of traffic participants around the prediction target in the traffic area, a confirmation state information acquirer configured to acquire confirmation state information regarding a surrounding confirmation state of a driver of the prediction target, a moving speed predictor configured to predict a future moving speed of the prediction target on a basis of the movement state information, the surrounding state information, and the confirmation state information, and a collision predictor configured to predict whether or not a collision will occur in a future of the prediction target on the basis of the movement state information, the surrounding state information, and the future moving speed.

(2) In this case, the confirmation state information acquirer preferably generates the confirmation state information on the basis of face image data of the driver captured by a camera provided in the prediction target and the surrounding state information.

(3) In this case, the confirmation state information preferably includes the number of surrounding confirmations by the driver, and the moving speed predictor preferably predicts the future moving speed more highly in a case where the number of surrounding confirmations is less than a threshold of the number of confirmations than in a case where the number of surrounding confirmations is equal to or greater than the threshold of the number of confirmations.

(4) In this case, the confirmation state information acquirer preferably calculates a direction of a line of sight of the driver on the basis of the face image data and counts the number of surrounding confirmations on condition that the direction of the line of sight is within a range determined on the basis of the surrounding state information.

(5) In this case, the confirmation state information preferably includes a time period for surrounding confirmations by the driver, and the moving speed predictor preferably predicts the future moving speed more highly in a case where the time period for surrounding confirmations is less than a threshold of a time period for confirmations than in a case where the time period for surrounding confirmations is equal to or greater than the threshold of the time period for confirmations.

(6) In this case, the confirmation state information acquirer preferably calculates a direction of a line of sight of the driver on the basis of the face image data and counts the time period for surrounding confirmations on condition that the direction of the line of sight is within a range determined on the basis of the surrounding state information.

(7) In this case, the confirmation state information acquirer preferably generates the confirmation state information on the basis of biological information of the driver detected by a biological information sensor provided in the prediction target.

(8) In this case, the moving speed predictor preferably includes a reference risk map generator configured to generate a reference risk map that associates a moving speed of the prediction target with a risk value in the future of the prediction target on the basis of the movement state information and the surrounding state information, a recognition state estimation map generator configured to generate a recognition state estimation map by correcting the reference risk map on the basis of the confirmation state information, and a future moving speed calculator configured to calculate the future moving speed on the basis of the recognition state estimation map.

(9) In this case, the future moving speed calculator preferably calculates the future moving speed so that both of a risk value and acceleration or deceleration of the prediction target to be calculated on the basis of the recognition state estimation map are reduced.

(10) A traffic safety support system according to the present invention includes on-board devices that move along with the prediction target, and a traffic management server capable of communicating with the on-board devices, the traffic management server includes the moving body prediction device and a support information notifier configured to transmit, to the on-board devices, support information including information regarding a prediction result of the collision predictor in a case where it is predicted by the collision predictor that the prediction target will collide, and the on-board devices include an on-board notification device configured to notify the driver of the information generated on a basis of the support information by at least one selected from an image and sound.

(11) In this case, the moving body prediction device preferably further includes a support behavior information generator configured to generate support action information regarding action for avoiding a collision or action for reducing damage due to the collision on the basis of the movement state information and the surrounding state information in a case where it is predicted by the collision predictor that the prediction target will collide, the support information notifier preferably transmits, to the on-board devices, the information regarding the prediction result and the support information including the support action information, and the on-board notification device preferably notifies the driver of the information, by at least one selected from an image and sound, generated so that the driver performs a driving operation according to the support action information.

(12) A traffic safety support system according to the present invention includes on-board devices that move along with the prediction target, and a traffic management server capable of communicating with the on-board devices, the traffic management server includes the moving body prediction device and a support information notifier configured to transmit, to the on-board devices, support information including information regarding a prediction result of the collision predictor in a case where it is predicted by the collision predictor that the prediction target will collide, and the on-board devices include an on-board driving support device configured to automatically control behavior of the prediction target on a basis of the support information.

(13) In this case, the moving body prediction device preferably further includes a support action information generator configured to generate support action information regarding action for avoiding a collision or action for reducing damage due to the collision on the basis of the movement state information and the surrounding state information, the support information notifier preferably transmits, to the on-board devices, the information regarding the prediction result and the support information including the support action information, and the on-board driving support device preferably automatically controls behavior of the prediction target on the basis of the support action information.

(1) A moving body prediction device includes a movement state information acquirer configured to acquire movement state information regarding a movement state of a prediction target which is a moving body, a surrounding state information acquirer configured to acquire surrounding state information regarding movement states of traffic participants around the prediction target, and a confirmation state information acquirer configured to acquire confirmation state information regarding a surrounding confirmation state of a driver of the prediction target. Further, the moving body prediction device includes a moving speed predictor configured to predict a future moving speed of the prediction target on a basis of the acquired moving body state information, surrounding state information, and confirmation state information, and a collision predictor configured to predict whether or not a collision will occur in the future of the prediction target on the basis of the movement state information, the surrounding state information, and the future moving speed. Thus, according to the present invention, the future moving speed can be predicted using the confirmation state information in addition to the moving body state information and the surrounding state information while reflecting the surrounding confirmation state by the driver, which makes it possible to predict, with high precision, the future moving speed and whether or not a collision will occur in the future.

(2) The confirmation state information acquirer generates the confirmation state information on the basis of face image data of the driver captured by a camera provided in the prediction target and the surrounding state information. Thus, according to the present invention, the direction of the line of sight obtained from the face image data can be compared with the positions of the traffic participants around the prediction target obtained from the surrounding state information, which makes it possible to generate the confirmation state information in which the confirmation state of the traffic participants around the prediction target by the driver is appropriately reflected. Thus, according to the present invention, it is possible to predict, with high precision, the future moving speed and whether or not a collision will occur.

(3) The moving speed predictor predicts the future moving speed more highly in a case where the number of surrounding confirmations is less than a threshold of the number of confirmations than in a case where the number of surrounding confirmations is equal to or greater than the threshold of the number of confirmations. Thus, according to the present invention, it is possible to predict, with high precision, the future moving speed and whether or not a collision will occur while reflecting the number of surrounding confirmations by the driver.

(4) The confirmation state information acquirer calculates a direction of a line of sight of the driver on the basis of the face image data and counts the number of surrounding confirmations on condition that the direction of the line of sight is within a range determined on the basis of the surrounding state information. Thus, according to the present invention, it is possible to appropriately count the number of surrounding confirmations while reflecting the positions of the traffic participants existing around the prediction target, which makes it possible to predict, with high precision, the future moving speed and whether or not a collision will occur.

(5) The moving speed predictor predicts the future moving speed more highly in a case where the time period for surrounding confirmations is less than a threshold of a time period for confirmations than in a case where the time period for surrounding confirmations is equal to or greater than the threshold of the time period for confirmations. Thus, according to the present invention, it is possible to predict, with high precision, the future moving speed and whether or not a collision will occur while reflecting the time period for surrounding confirmations by the driver.

(6) The confirmation state information acquirer calculates a direction of a line of sight of the driver on the basis of the face image data and counts the time period for surrounding confirmations on condition that the direction of the line of sight is within a range determined on the basis of the surrounding state information. Thus, according to the present invention, it is possible to appropriately count the time period for surrounding confirmations while reflecting the positions of the traffic participants existing around the prediction target, which makes it possible to predict, with high precision, the future moving speed and whether or not a collision will occur.

(7) The confirmation state information acquirer generates the confirmation state information on the basis of biological information of the driver detected by a biological information sensor provided in the prediction target. Thus, according to the present invention, it is possible to generate the confirmation state information by reflecting the conditions of the body of the driver at that time, which makes it possible to predict, with high precision, the future moving speed and whether or not a collision will occur.

(8) A reference risk map generator generates a reference risk map that associates a moving speed of the prediction target with a risk value in the future of the prediction target on the basis of the movement state information and the surrounding state information, a recognition state estimation map generator generates a recognition state estimation map by correcting the reference risk map on the basis of the confirmation state information, and a future moving speed calculator calculates the future moving speed on the basis of the recognition state estimation map. Thus, according to the present invention, it is possible to predict, with high precision, the future moving speed and whether or not a collision will occur, by using the recognition state estimation map in which the surrounding confirmation state by the driver is reflected.

(9) The future moving speed calculator calculates the future moving speed so that both of a risk value and acceleration or deceleration of the prediction target to be calculated on the basis of the recognition state estimation map are reduced. Thus, according to the present invention, it is possible to predict, with high precision, the future moving speed and whether or not a collision will occur, while reflecting both of the risk value and the acceleration or deceleration.

(10) A traffic safety support system includes on-board devices that move along with the prediction target in the traffic area, and a traffic management server capable of communicating with the on-board devices and including the moving body prediction device. Thus, according to the present invention, the movement state information of the prediction target, the surrounding state information, the confirmation state information and the like can be collected by the traffic management server, which makes it possible to predict, with high precision, whether or not a collision will occur in the future of the prediction target. Further, in a case where it is predicted that the prediction target will collide, the support information notifier of the traffic management server transmits, to the on-board devices, the support information including the information regarding the prediction result, and the on-board notification device of the on-board devices notifies the driver of the information generated on the basis of the support information by at least one selected from the image and sound. Thus, according to the present invention, the driver of the prediction target having received the notification can make the action for avoiding the predicted collision or reducing the damage due to the collision.

(11) In a case where it is predicted by the collision predictor that the prediction target will collide, the traffic management server generates support action information regarding action for avoiding collision or action for reducing damage due to collision, and transmits, to the on-board devices, the support information including the support action information. Further, the on-board notification device notifies the driver of the information, by at least one selected from the image and sound, generated so that the driver performs the driving operation according to the support action information. Thus, according to the present invention, the driver of the prediction target having received the notification performs the driving operation according to the notification, which makes it possible to avoid the predicted collision or reduce the damage due to the collision.

(12) According to the present invention, by the same reasons as the invention disclosed in (10), the movement state information of the prediction target, the surrounding state information, the confirmation state information and the like can be collected by the traffic management server, which makes it possible to predict, with high precision, whether or not a collision will occur in the future of the prediction target. Further, in a case where it is predicted that the prediction target will collide, the support information notifier of the traffic management server transmits, to the on-board devices, the support information including the information regarding the prediction result, and the on-board driving support device of the on-board devices automatically controls behavior of the prediction target on the basis of the support information. Thus, according to the present invention, the traffic management server can automatically control the behavior of the prediction target through the notification, which makes it possible to automatically avoid the predicted collision or reduce the damage due to the collision.

(13) In a case where it is predicted by the collision predictor that the prediction target will collide, the traffic management server generates support action information regarding action for avoiding collision or action for reducing damage due to collision, and transmits, to the on-board devices, the support information including the support action information. Further, the on-board driving support device automatically controls the behavior of the prediction target on the basis of the support action information. Thus, according to the present invention, the traffic management server can automatically avoid the predicted collision or reduce the damage due to the collision while reflecting the movement state of the prediction target and the state of the surroundings of the prediction target.

BRIEF DESCRIPTION OF THE DRAWINGS

FIG. 7 is a view illustrating an example of the reference risk map for a second traffic participant defined as a prediction target under the example illustrated in FIG. 5, the map being generated by the reference risk map generator;

FIG. 8A is a view illustrating an example of a recognition state estimation map in a case where the first traffic participant is defined as a prediction target in the example illustrated in FIG. 5;

FIG. 8B is a view illustrating an example of a recognition state estimation map in a case where the first traffic participant is defined as a prediction target in the example illustrated in FIG. 5;

FIG. 9 is an example of an image displayed by an on-board notification device; and FIG. 10 is a flowchart illustrating specific procedure of traffic safety support processing by a traffic management server.

DETAILED DESCRIPTION OF THE INVENTION

A traffic safety support system according to one embodiment of the present invention will be described below with reference to the drawings.

Figure 1:
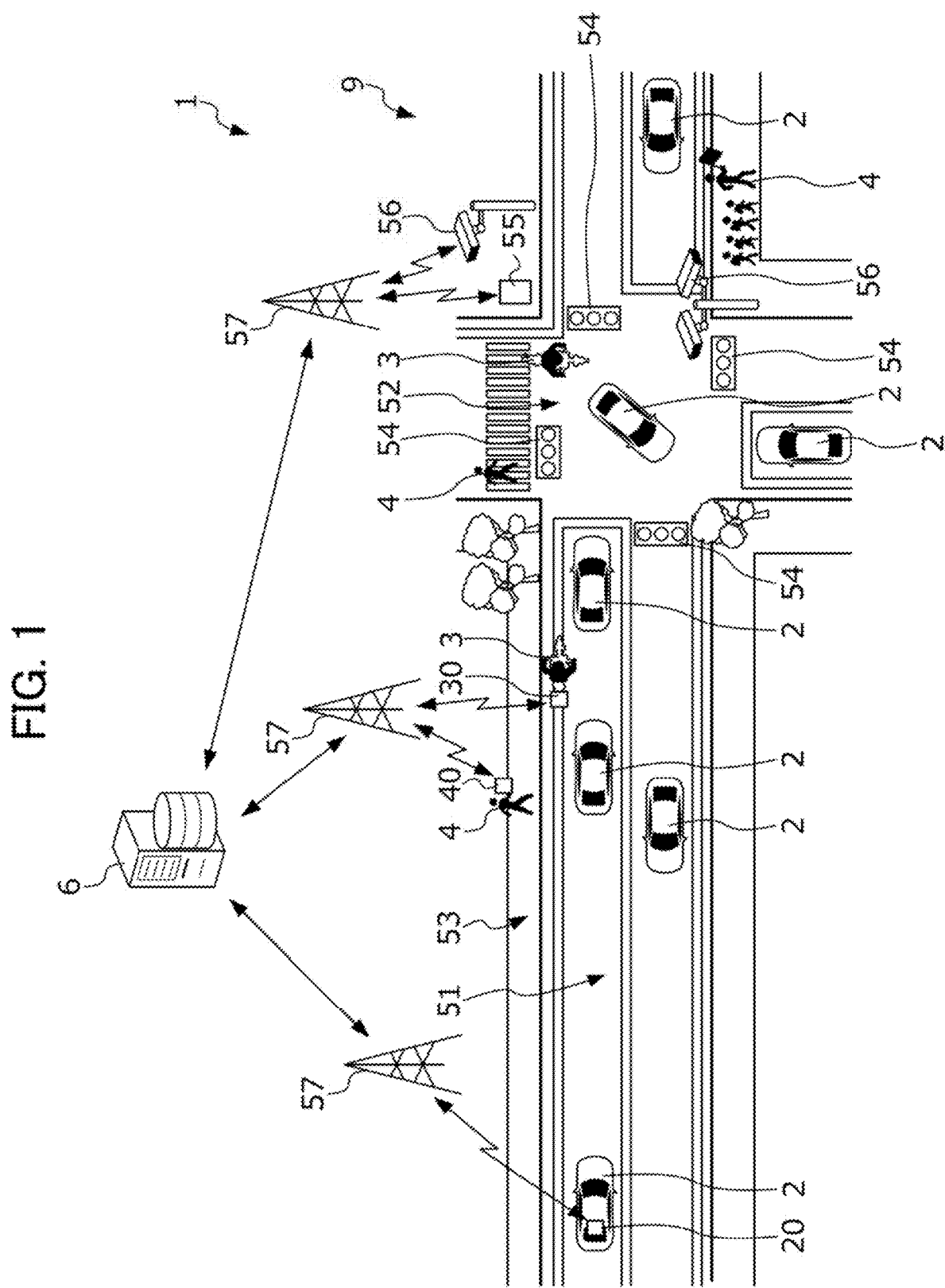
FIG. 1 is a view illustrating a configuration of a traffic safety support system according to one embodiment of the present invention and part of a target traffic area to be supported by the traffic safety support system.

FIG. 1 is a view schematically illustrating a configuration of a traffic safety support system 1 according to the present embodiment and part of a target traffic area 9 in which traffic participants to be supported by the traffic safety support system 1 exist.

The traffic safety support system 1 supports safe and smooth traffic of traffic participants in the target traffic area 9 by recognizing, as individual traffic participants, pedestrians 4 who are persons moving in the target traffic area 9 and four-wheeled vehicles 2, motorcycles 3, and the like that are moving bodies moving in the target traffic area 9, and notifying each traffic participant of support information generated through the recognition to encourage communication (specifically, for example, reciprocal recognition between the traffic participants) between the traffic participants that move on the basis of intentions of the traffic participants and recognition of a surrounding traffic environment and to automatically control behavior of the moving bodies.

FIG. 1 illustrates a case where an area around an intersection 52 in an urban area, including a road 51, the intersection 52, a pavement 53 and traffic lights 54 as traffic infrastructure equipment is set as the target traffic area 9. FIG. 1 illustrates a case where a total of seven four-wheeled vehicles 2 and a total of two motorcycles 3 move on the road 51 and at the intersection 52 and a total of three sets of pedestrians 4 move on the pavement 53 and at the intersection 52. Further, FIG. 1 illustrates a case where a total of three infrastructure cameras 56 are provided.

The traffic safety support system 1 includes on-board devices 20 (including on-board devices mounted on individual four-wheeled vehicles 2 and mobile information processing terminals possessed or worn by drivers who drive the individual four-wheeled vehicles 2) that move along with the individual four-wheeled vehicles 2, on-board devices 30 (including on-board devices mounted on individual motorcycles 3 and mobile information processing terminals possessed or worn by drivers who drive the individual motorcycles 3) that move along with the individual motorcycles 3, mobile information processing terminals 40 possessed or worn by the respective pedestrians 4, a plurality of the infrastructure cameras 56 provided in the target traffic area 9, a traffic light control device 55 that controls the traffic lights 54, and a traffic management server 6 connected to a plurality of terminals (hereinafter, also simply referred to as "area terminals") such as these on-board devices 20 and 30, the mobile information processing terminals 40, the infrastructure cameras 56 and the traffic light control device 55 existing in the target traffic area 9 so as to be able to perform communication.

The traffic management server 6 includes one or more computers connected to the above-described plurality of area terminals via base stations 57 so as to be able to perform communication. More specifically, the traffic management server 6 includes a server connected to the plurality of area terminals via the base stations 57, a network core and the Internet, an edge server connected to the plurality of area terminals via the base stations 57 and an MEC (multi-access edge computing) core, and the like.

Figure 2:
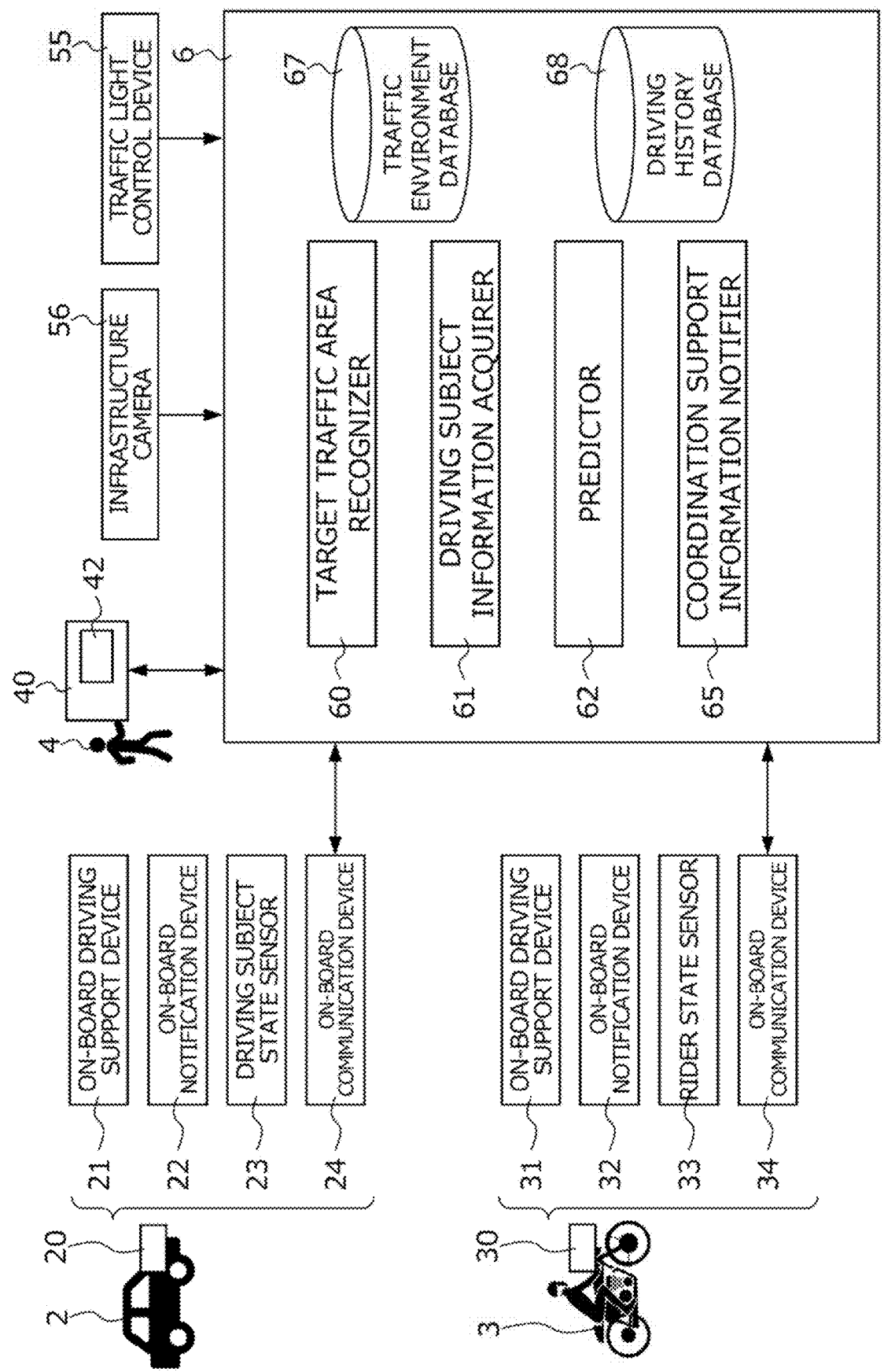
FIG. 2 is a block diagram illustrating a configuration of a coordination support device and a plurality of area terminals connected to the coordination support device so as to be able to perform communication.

FIG. 2 is a block diagram illustrating a configuration of the traffic management server 6 and a plurality of area terminals connected to the traffic management server 6 so as to be able to perform communication.

The on-board devices 20 mounted on the four-wheeled vehicle 2 in the target traffic area 9 include, for example, an on-board driving support device 21 that supports driving by a driver, an on-board notification device 22 that notifies the driver of various kinds of information, a driving subject state sensor 23 that detects a state of the driver who is driving, an on-board communication device 24 that performs wireless communication between the own vehicle, and the traffic management server 6 and other vehicles near the own vehicle, and the like.

The on-board driving support device 21 includes an external sensor unit, an own vehicle state sensor, a navigation device, a driving support ECU, and the like. The external sensor unit includes an exterior camera unit that captures an image around the own vehicle, a plurality of on-board external sensors mounted on the own vehicle, such as a radar unit and a LIDAR (light detection and ranging) unit that detects a target outside the vehicle using an electromagnetic wave, and an outside recognition device that acquires information regarding a state around the own vehicle by performing sensor fusion processing on detection results by these on-board external sensors. The own vehicle state sensor includes a sensor that acquires information regarding a traveling state of the own vehicle, such as a vehicle speed sensor, an acceleration sensor, a steering angle sensor, a yaw rate sensor, a position sensor and an orientation sensor. The navigation device includes, for example, a GNSS (global navigation satellite system) receiver that specifies a current position of the own vehicle on the basis of a signal received from a GNSS satellite, a storage device that stores map information, and the like.

The driving support ECU executes driving support control that automatically controls behavior of the vehicle, such as lane departure prevention control, lane change control, preceding vehicle following control, erroneous start prevention control, collision mitigation brake control, and collision avoidance control on the basis of the information acquired by an on-board sensing device such as the external sensor unit, the own vehicle state sensor, and the navigation device and coordination support information transmitted from the traffic management server 6. Further, the driving support ECU generates driving support information for supporting safe driving by the driver on the basis of the information acquired by the external sensor unit, the own vehicle state sensor, the navigation device, and the like, and transmits the driving support information to the on-board notification device 22.

The driving subject state sensor 23 includes various devices that acquire time-series data of information correlated with driving capability of the driver who is driving. The driving subject state sensor 23 includes, for example, an on-board camera that acquires face image data of the driver who is driving, a biological information sensor that acquires biological information of the driver who is driving, and the like. Here, the biological information sensor more specifically includes a seat belt sensor that is provided at a seat belt to be fastened by the driver and detects a pulse of the driver, whether or not the driver breathes, and the like, a steering sensor that is provided at a steering to be gripped by the driver and detects a skin potential of the driver, and a wearable terminal that detects a heart rate, a blood pressure, a degree of saturation of oxygen in blood, and the like.

The on-board communication device 24 has a function of transmitting, to the traffic management server 6, the information acquired by the driving support ECU (including the information acquired by the external sensor unit, the own vehicle state sensor, the navigation device, and the like, control information regarding driving support control that is being executed, and the like), the information regarding the driving subject acquired by the driving subject state sensor 23 (the face image data and the biological information of the driver), and the like, and a function of receiving coordination support information transmitted from the traffic management server 6 and transmitting the received coordination support information to the on-board driving support device 21 and the on-board notification device 22.

The on-board notification device 22 includes various devices that notify the driver of various kinds of information through auditory sense, visual sense, haptic sense, and the like, by causing a human machine interface (hereinafter, may be abbreviated as an "HMI") to operate in an aspect determined on the basis of the driving support information transmitted from the on-board driving support device 21 and the coordination support information transmitted from the traffic management server 6.

The on-board devices 30 mounted on the motorcycle 3 in the target traffic area 9 include, for example, an on-board driving support device 31 that supports driving by a rider, an on-board notification device 32 that notifies the rider of various kinds of information, a rider state sensor 33 that detects a state of the rider who is driving, an on-board communication device 34 that performs wireless communication between the own vehicle, and the traffic management server 6 and other vehicles near the own vehicle, and the like.

The on-board driving support device 31 includes an external sensor unit, an own vehicle state sensor, a navigation device, a driving support ECU, and the like. The external sensor unit includes an exterior camera unit that captures an image around the own vehicle, a plurality of on-board external sensors mounted on the own vehicle such as a radar unit and a LIDAR unit that detects a target outside the vehicle by using an electromagnetic wave, and an outside recognition device that acquires information regarding a state around the own vehicle by performing sensor fusion processing on detection results by the on-board exterior sensors. The own vehicle state sensor includes sensors that acquire information regarding a traveling state of the own vehicle such as a vehicle speed sensor and a five-axis or six-axis inertial measurement device. The navigation device includes, for example, a GNSS receiver that specifies a current position on the basis of a signal received from a GNSS satellite, a storage device that stores map information, and the like.

The driving support ECU executes driving support control that automatically controls behavior of the vehicle, such as lane keeping control, lane departure prevention control, lane change control, preceding vehicle following control, erroneous start prevention control, and collision mitigation brake control on the basis of the information acquired by an on-board sensing device such as the external sensor unit, the own vehicle state sensor, and the navigation device and coordination support information transmitted from the traffic management server 6. Further, the driving support ECU generates driving support information for supporting safe driving by the rider on the basis of the information acquired by the external sensor unit, the own vehicle state sensor, the navigation device, and the like, and transmits the driving support information to the on-board notification device 32.

The rider state sensor 33 includes various devices that acquire information correlated with driving capability of the rider who is driving. The rider state sensor 33 includes, for example, an on-board camera that acquires face image data of the rider who is driving, a biological information sensor that acquires biological information of the rider who is driving, and the like. Here, the biological information sensor more specifically includes a seat sensor that is provided at a seat to be seated by the rider and detects a pulse of the rider, whether or not the rider breathes, and the like, a helmet sensor that is provided at a helmet to be worn by the rider and detects a pulse of the rider, whether or not the rider breathes, a skin potential of the rider, and the like, and a wearable terminal that detects a heart rate, a blood pressure, a degree of saturation of oxygen in blood, and the like.

The on-board communication device 34 has a function of transmitting, to the traffic management server 6, the information acquired by the driving support ECU (including the information acquired by the external sensor unit, the own vehicle state sensor, the navigation device, and the like, control information regarding driving support control that is being executed, and the like), the information regarding the rider acquired by the rider state sensor 33 (the face image data and the biological information of the rider), and the like, and a function of receiving coordination support information transmitted from the traffic management server 6 and transmitting the received coordination support information to the on-board driving support device 31 and the on-board notification device 32.

The on-board notification device 32 includes various devices that notify the rider of various kinds of information through auditory sense, visual sense, haptic sense, and the like of the rider, by causing the HMI to operate in an aspect determined on the basis of the driving support information transmitted from the on-board driving support device 21 and the coordination support information transmitted from the traffic management server 6.

The mobile information processing terminal 40 possessed or worn by the pedestrian 4 in the target traffic area 9 includes, for example, a wearable terminal to be worn by the pedestrian 4, a smartphone possessed by the pedestrian 4, and the like. The wearable terminal has a function of measuring biological information of the pedestrian 4 such as a heart rate, a blood pressure and a degree of saturation of oxygen in blood and transmitting the measurement data of the biological information to the traffic management server 6, transmitting pedestrian information regarding the pedestrian 4 such as position information, travel acceleration, and schedule information of the pedestrian 4, and receiving the coordination support information transmitted from the traffic management server 6.

Further, the mobile information processing terminal 40 includes a notification device 42 that notifies the pedestrian of various kinds of information through auditory sense, visual sense, haptic sense, and the like, of the pedestrian by causing the HMI to operate in an aspect determined on the basis of the received coordination support information.

The infrastructure camera 56 captures images of traffic infrastructure equipment including a road, an intersection and a pavement in a target traffic area and moving bodies and pedestrians that move on the road, the intersection, the pavement, and the like, and transmits the obtained image information to the traffic management server 6.

The traffic light control device 55 controls the traffic lights and transmits traffic light state information regarding current lighting color of the traffic lights provided in the target traffic area, a timing at which the lighting color is switched, and the like, to the traffic management server 6.

The traffic management server 6 is a computer that supports safe and smooth traffic of traffic participants in the target traffic area by generating coordination support information for encouraging communication between the traffic participants and recognition of a surrounding traffic environment for each traffic participant to be supported on the basis of the information acquired from a plurality of area terminals existing in the target traffic area as described above and notifying each traffic participant of the coordination support information. Note that in the present embodiment, traffic participants including means for receiving the coordination support information generated at the traffic management server 6 and causing the HMI to operate in an aspect determined on the basis of the received coordination support information (for example, the on-board devices 20 and 30, the mobile information processing terminal 40 and the notification devices 22, 32 and 42) among the plurality of traffic participants existing in the target traffic area are set as targets to be supported by the traffic management server 6.

The traffic management server 6 includes a target traffic area recognizer 60 that recognizes persons and moving bodies in the target traffic area as individual traffic participants, a driving subject information acquirer 61 that acquires driving subject state information correlated with driving capabilities of driving subjects of the moving bodies recognized as the traffic participants by the target traffic area recognizer 60, a predictor 62 that predicts futures of a plurality of traffic participants in the target traffic area, a coordination support information notifier 65 that transmits coordination support information generated for each of the individual traffic participants recognized as support targets by the target traffic area recognizer 60, a traffic environment database 67 in which information regarding a traffic environment of the target traffic area is accumulated, and a driving history database 68 in which information regarding past driving history by the driving subjects registered in advance is accumulated.

In the traffic environment database 67, information regarding traffic environments of the traffic participants in the target traffic area such as map information of the target traffic area registered in advance (for example, a width of the road, the number of lanes, speed limit, a width of the pavement, whether or not there is a guardrail between the road and the pavement, a position of a crosswalk) and risk area information regarding a high risk area with a particularly high risk in the target traffic area, is stored. In the following description, the information stored in the traffic environment database 67 will be also referred to as registered traffic environment information.

In the driving history database 68, information regarding past driving history of the driving subjects registered in advance is stored in association with registration numbers of moving bodies possessed by the driving subjects. Thus, if the registration numbers of the recognized moving bodies can be specified by the target traffic area recognizer 60 which will be described later, the past driving history of the driving subjects of the recognized moving bodies can be acquired by searching the driving history database 68 on the basis of the registration numbers. In the following description, the information stored in the driving history database 68 will also be referred to as registered driving history information.

The target traffic area recognizer 60 recognizes traffic participants that are persons or moving bodies in the target traffic area and recognition targets including traffic environments of the respective traffic participants in the target traffic area on the basis of the information transmitted from the above-described area terminal (the on-board devices 20 and 30, the mobile information processing terminal 40, the infrastructure camera 56 and the traffic light control device 55) in the target traffic area and the registered traffic environment information read from the traffic environment database 67 and acquires recognition information regarding the recognition targets.

Here, the information transmitted from the on-board driving support device 21 and the on-board communication device 24 included in the on-board devices 20 to the target traffic area recognizer 60 and the information transmitted from the on-board driving support device 31 and the on-board communication device 34 included in the on-board devices 30 to the target traffic area recognizer 60 include information regarding traffic participants around the own vehicle and a state regarding the traffic environment acquired by the external sensor unit, information regarding a state of the own vehicle as one traffic participant acquired by the own vehicle state sensor, the navigation device and the like, and the like. Further, the information transmitted from the mobile information processing terminal 40 to the target traffic area recognizer 60 includes information regarding a state of a pedestrian as one traffic participant, such as a position and travel acceleration. Still further, the image information transmitted from the infrastructure camera 56 to the target traffic area recognizer 60 includes information regarding the respective traffic participants and traffic environments of the traffic participants, such as appearance of the traffic infrastructure equipment such as the road, the intersection and the pavement, and appearance of traffic participants moving in the target traffic area. Further, the traffic light state information transmitted from the traffic light control device 55 to the target traffic area recognizer 60 includes information regarding traffic environments of the respective traffic participants such as current lighting color of the traffic lights and a timing for switching the lighting color. Further, the registered traffic environment information to be read by the target traffic area recognizer 60 from the traffic environment database 67 includes information regarding traffic environments of the respective traffic participants such as map information, the risk area information, and the like, of the target traffic area.

Thus, the target traffic area recognizer 60 can acquire recognition information of each traffic participant (hereinafter, also referred to as "traffic participant recognition information") such as a position of each traffic participant in the target traffic area, a moving vector (that is, a vector extending along a moving direction and having a length proportional to moving speed), travel acceleration, a vehicle type of the moving body, a vehicle rank, registration number of the moving body, the number of people of the pedestrian and an age group of the pedestrian on the basis of the information transmitted from the area terminals. Further, the target traffic area recognizer 60 can acquire recognition information of the traffic environment (hereinafter, also referred to as "traffic environment recognition information") of each traffic participant in the target traffic area such as a width of the road, the number of lanes, speed limit, a width of the pavement, whether or not there is a guardrail between the road and the pavement, lighting color of the traffic light, a switching timing of the lighting color, and the risk area information on the basis of the information transmitted from the area terminals.

The target traffic area recognizer 60 transmits the traffic participant recognition information and the traffic environment recognition information acquired as described above to the driving subject information acquirer 61, the predictor 62, the coordination support information notifier 65, and the like.

The driving subject information acquirer 61 acquires driving subject state information and driving subject characteristic information correlated with current driving capabilities of the driving subjects of the moving bodies recognized as the traffic participants by the target traffic area recognizer 60 on the basis of the information transmitted from the above-described area terminals (particularly, the on-board devices 20 and 30) in the target traffic area and the registered driving history information read from the driving history database 68.

More specifically, in a case where the driving subject of the four-wheeled vehicle recognized as the traffic participant by the target traffic area recognizer 60 is a person, the driving subject information acquirer 61 acquires the information transmitted from the on-board devices 20 mounted on the four-wheeled vehicle as driving subject state information of the driver. Further, in a case where the driving subject of the motorcycle recognized as the traffic participant by the target traffic area recognizer 60 is a person, the driving subject information acquirer 61 acquires the information transmitted from the on-board devices 30 mounted on the motorcycle as driving subject state information of the rider.

Here, the information to be transmitted from the driving subject state sensor 23 and the on-board communication device 24 included in the on-board devices 20 to the driving subject information acquirer 61 includes face image data of the driver who is driving, and time-series data such as biological information of the driver who is driving, which is correlated with driving capability of the driver who is driving. Further, the information to be transmitted from the rider state sensor 33 and the on-board communication device 34 included in the on-board devices 30 to the driving subject information acquirer 61 includes face image data of the rider who is driving, and time-series data such as biological information of the rider who is driving, which is correlated with driving capability of the rider who is driving. Further, the information to be transmitted from the mobile information processing terminals 25 and 35 included in the on-board devices 20 and 30 to the driving subject information acquirer 61 includes personal schedule information of the driver and the rider. In a case where the driver and the rider drive the moving bodies, for example, under tight schedule, there is a case where the driver and the rider may feel pressed, and driving capabilities may degrade. Thus, it can be said that the personal schedule information of the driver and the rider is information correlated with the driving capabilities of the driver and the rider.

The driving subject information acquirer 61 acquires driving subject characteristic information regarding characteristics (such as, for example, too many times of sudden lane change and too many times of sudden acceleration and deceleration) regarding driving of the driving subject correlated with current driving capability of the driving body who is driving by using both or one of the driving subject state information for the driving subject acquired through the following procedure and the registered driving history information read from the driving history database 68.

The driving subject information acquirer 61 transmits the driving subject state information and the driving subject characteristic information of the driving subject acquired as described above to the predictor 62, the coordination support information notifier 65 and the like.

The predictor 62 extracts part of the traffic area in the target traffic area as a monitoring area and predicts risks in the future of prediction target determined among a plurality of traffic participants in the monitoring area on the basis of the traffic participant recognition information and the traffic environment recognition information acquired by the target traffic area recognizer 60 and the driving subject state information and the driving subject characteristic information acquired by the driving subject information acquirer 61.

Here, the target traffic area is a traffic area of a relatively broad range determined, for example, in municipal units. In contrast, the monitoring area is a traffic area such as, for example, an area near an intersection and a specific facility, through which a four-wheeled vehicle can pass in an approximately few tens of seconds in a case where the four-wheeled vehicle travels at legal speed.

Figure 3:
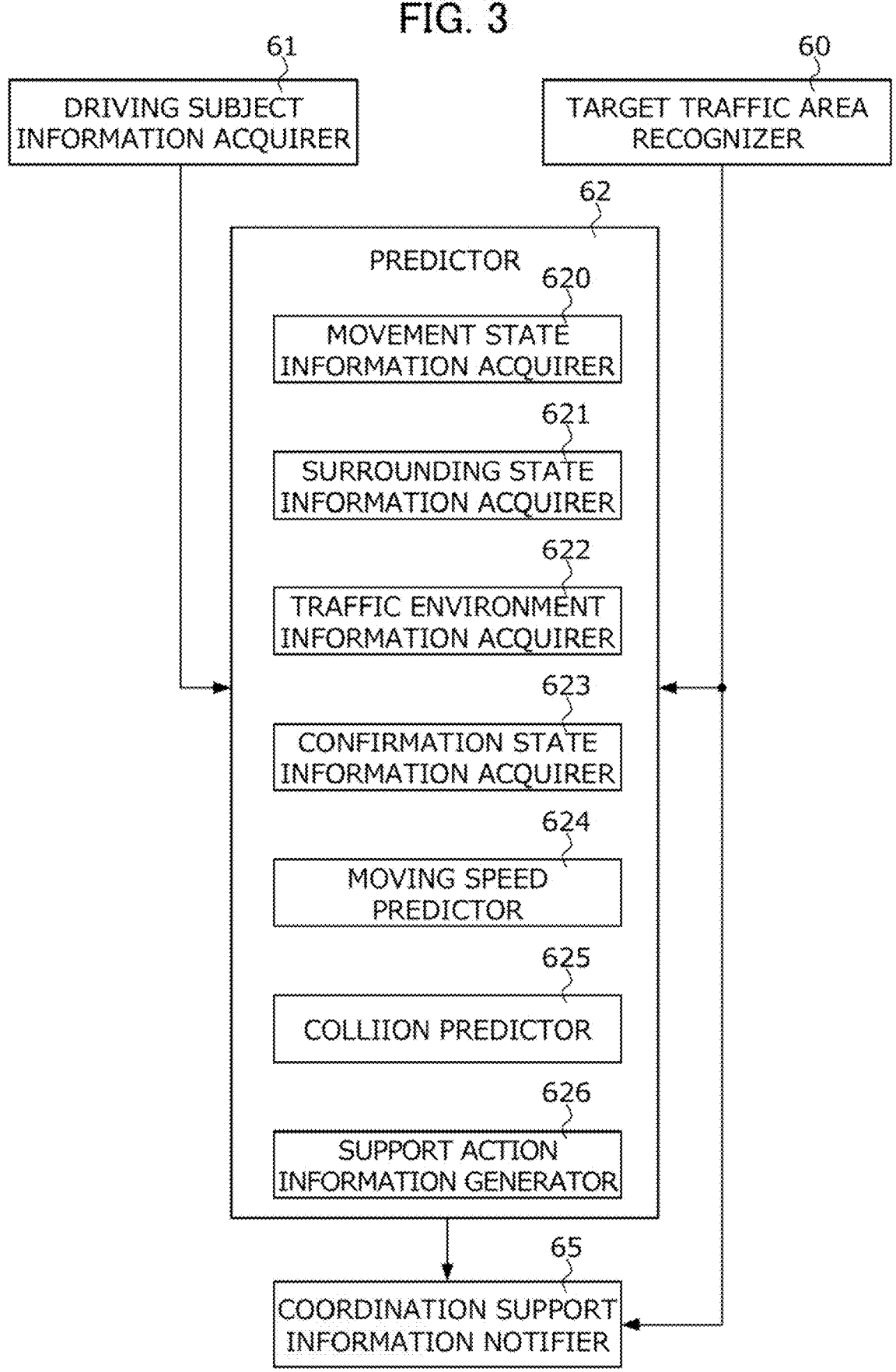
FIG. 3 is a functional block diagram illustrating a specific configuration of a predictor.

FIG. 3 is a functional block diagram illustrating a specific configuration of the predictor 62. The predictor 62, which includes a movement state information acquirer 620, a surrounding state information acquirer 621, a traffic environment information acquirer 622, a confirmation state information acquirer 623, a moving speed predictor 624, a collision predictor 625, and a support action information generator 626, predicts future risks of the prediction target in the monitoring area by using these.

The movement state information acquirer 620 determines, as a prediction target, one person among the plurality of traffic participants existing in the monitoring area on the basis of the traffic participant recognition information transmitted from the target traffic area recognizer 60, and acquires movement state information regarding a movement state of the prediction target. More specifically, the movement state information acquirer 620 extracts information regarding a movement state of the prediction target from the traffic participant recognition information acquired by the target traffic area recognizer 60, and acquires the extracted information as the movement state information. Here, the movement state information includes, for example, a plurality of parameters that characterize a movement state of the prediction target such as a position of the prediction target, a moving vector, travel acceleration, a vehicle type, and a vehicle rank.

The surrounding state information acquirer 621 specifies a plurality of traffic participants existing around the prediction target in the monitoring area on the basis of the traffic participant recognition information transmitted from the target traffic area recognizer 60, and acquires surrounding state information regarding movement states of the plurality of traffic participants existing around the prediction target. More specifically, the surrounding state information acquirer 621 extracts information regarding movement states of the plurality of traffic participants existing around the prediction target from the traffic participant recognition information acquired by the target traffic area recognizer 60, and acquires the extracted information as the surrounding state information. Here, the surrounding state information includes, for example, a plurality of parameters that characterize a movement state of each traffic participant such as a position, a moving vector, travel acceleration, a vehicle type, and a vehicle rank of each traffic participant existing around the prediction target.

The traffic environment information acquirer 622 acquires traffic environment information of the surroundings of the prediction target in the monitoring area on the basis of the traffic environment recognition information transmitted from the target traffic area recognizer 60 and the registered traffic environment information stored in the traffic environment database 67. More specifically, the traffic environment information acquirer 622 extracts information regarding a surrounding traffic environment for the monitoring area or the prediction target from the traffic environment recognition information acquired by the target traffic area recognizer 60 and the registered traffic environment information stored in the traffic environment database 67, and acquires the extracted information as the traffic environment information. Here, the traffic environment information includes, for example, a plurality of parameters that characterize a surrounding traffic environment for the prediction target such as a width of the road, the number of lanes, speed limit, a width of the pavement, whether or not there is a guardrail between the road and the pavement, lighting color of the traffic light, a switching timing of the lighting color, and the risk area information.

The confirmation state information acquirer 623 acquires confirmation state information regarding a state of confirmation of surroundings by the driver of the prediction target on the basis of the driving subject state information transmitted from the driving subject information acquirer 61, the movement state information acquired by the movement state information acquirer 620, the surrounding state information acquired by the surrounding state information acquirer 621, and the traffic environment information acquired by the traffic environment information acquirer 622.

More specifically, the confirmation state information acquirer 623 extracts confirmation targets whose existence and states are to be confirmed by the driver of the prediction target (for example, the existence of moving bodies and pedestrians around the prediction target, such as a preceding vehicle, a following vehicle, and a parallel traveling vehicle, a state of the traffic light, and the like) on the basis of the movement state information, the surrounding state information, and the traffic environment information, so that the prediction target can safely and smoothly move in the monitoring area.

Further, the confirmation state information acquirer 623 extracts information regarding a driver of the prediction target from the driving subject state information transmitted from the driving subject information acquirer 61, and generates, as the confirmation state information, information regarding the confirmation state for each of the confirmation targets extracted as described above on the basis of the driving subject state information for the driver of the prediction target. The driving subject information acquired by the driving subject information acquirer 61 as described above includes face image data of the driver of the prediction target, time-series data such as biological information of the driver of the prediction target, and schedule information of the driver. Thus, the confirmation state information acquirer 623 generates confirmation state information on the basis of such driving subject information.

Note that in the present embodiment, a case will be described where the number of confirmations of the confirmation targets by the driver and a time period for confirmations by the driver are assumed to be the confirmation state information. In this case, the confirmation state information acquirer 623 calculates a direction of a line of sight of the driver on the basis of the face image data of the driver of the prediction target. Further, the confirmation state information acquirer 623 calculates a relative position of each confirmation target with respect to the driver of the prediction target on the basis of the movement state information, the surrounding state information, and the traffic environment information, and calculates a line-of-sight range in the direction of the line of sight of the driver for each of the confirmation targets according to the calculated relative position. Still further, the confirmation state information acquirer 623 counts the number of confirmations and the time period for confirmations with respect to the confirmation targets on condition that the direction of the line of sight of the driver is within the line-of-sight range determined for each of the confirmation targets.

The moving speed predictor 624 predicts a future moving speed of the prediction target in the monitoring area at a predetermined predicted period ahead on the basis of the confirmation state information generated by the movement state information, the surrounding state information, the traffic environment information, and the confirmation state information acquirer 623 through the above-described procedure. More specifically, the moving speed predictor 624 calculates a predicted traveling path of the prediction target in the monitoring area up to the predicted period ahead on the basis of the movement state information, the surrounding state information, the traffic environment information, the confirmation state information, and the like, and calculates, as the future moving speed, the moving speed of the prediction target at the predicted period ahead in a case where the prediction target is assumed to travel along the predicted traveling path. In the following description, specific procedure for calculating the future moving speed of the prediction target in the moving speed predictor 624 will be described with reference to FIGS. 4 to 8B.

Figure 4:
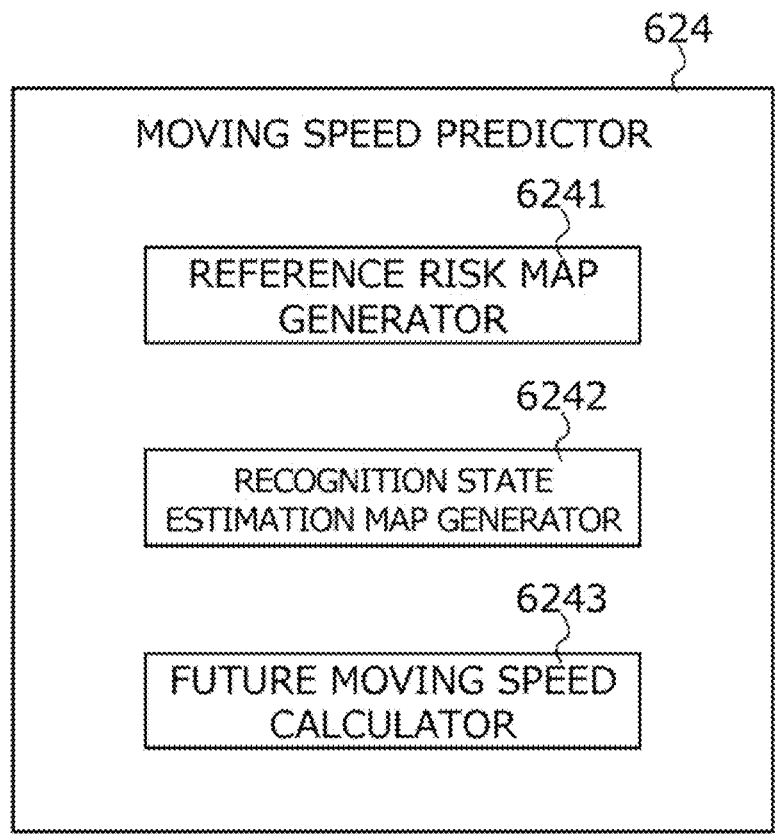
FIG. 4 is a functional block diagram illustrating a specific configuration of a moving speed predictor.

FIG. 4 is a functional block diagram illustrating a specific configuration of the moving speed predictor 624. The moving speed predictor 624, which includes a reference risk map generator 6241, a recognition state estimation map generator 6242, and a future moving speed calculator 6243, calculates a future moving speed of the prediction target by using these.

The reference risk map generator 6241 first calculates a predicted traveling path of the prediction target in the monitoring area up to the predicted period ahead on the basis of the movement state information, the surrounding state information, the traffic environment information, and the like. Note that in this event, the reference risk map generator 6241 may calculate the predicted traveling path while reflecting the registered driving history information for the driver of the prediction target transmitted from the driving subject information acquirer 61.

Next, the reference risk map generator 6241 generates a reference risk map that associates the moving speed of the prediction target with a collision risk value in the future of the prediction target on the basis of the movement state information, the surrounding state information and the traffic environment information. Here, a specific example of the reference risk map and specific procedure for generating the reference risk map in the reference risk map generator 6241 will be described with reference to FIGS. 5 to 7.

Figure 5:
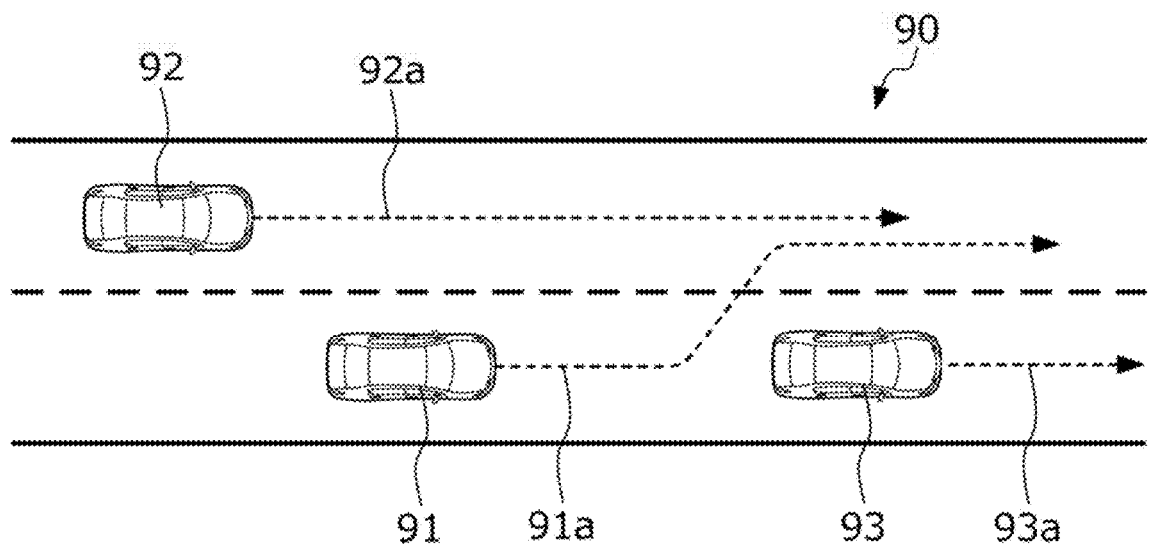
FIG. 5 is a view illustrating an example of a monitoring area.

FIG. 5 is a view illustrating an example of a monitoring area 90. FIG. 5 illustrates a case where traffic participants 91, 92, and 93 which are three four-wheeled vehicles are traveling in the monitoring area 90 which is a straight road with two lanes on each side. As illustrated in FIG. 5, at a time point at which prediction processing in the moving speed predictor 624 is started, the third traffic participant 93 and the first traffic participant 91 are traveling on the lane on the right side in order from the top, and the second traffic participant 92 is traveling on the lane on the left side and slightly behind the first traffic participant 91. Further, at the time point at which the prediction processing in the moving speed predictor 624 is started, the third traffic participant 93 is traveling at a speed slower than the speed of the first traffic participant 91, and the second traffic participant 92 is traveling at a speed faster than the speed of the first traffic participant 91.

First, the reference risk map generator 6241 calculates predicted traveling paths 91a, 92a, and 93a of the respective traffic participants 91, 92, and 93 as indicated by dashed-line arrows in FIG. 5. In other words, the reference risk map generator 6241 calculates the predicted traveling path 93a for the third traffic participant 93 that is traveling straight on the lane on the right side, and calculates the predicted traveling path 92a for the second traffic participant 92 that is traveling straight on the lane on the left side. Further, the reference risk map generator 6241 calculates the predicted traveling path 91a for the first traffic participant 91 that travels straight on the lane on the right side, and then overtakes the third traffic participant 93 by changing the lane to the lane on the left side at a time point at which the first traffic participant 91 arrives behind the third traffic participant 93 by a predetermined distance.

Next, the reference risk map generator 6241 generates a reference risk map for the prediction target in a case where the traffic participants 91 to 93 are assumed to travel along the respective predicted traveling paths 91a to 93a up to the predicted period ahead, on the basis of the movement state information, the surrounding state information and the traffic environment information.

Figure 6:
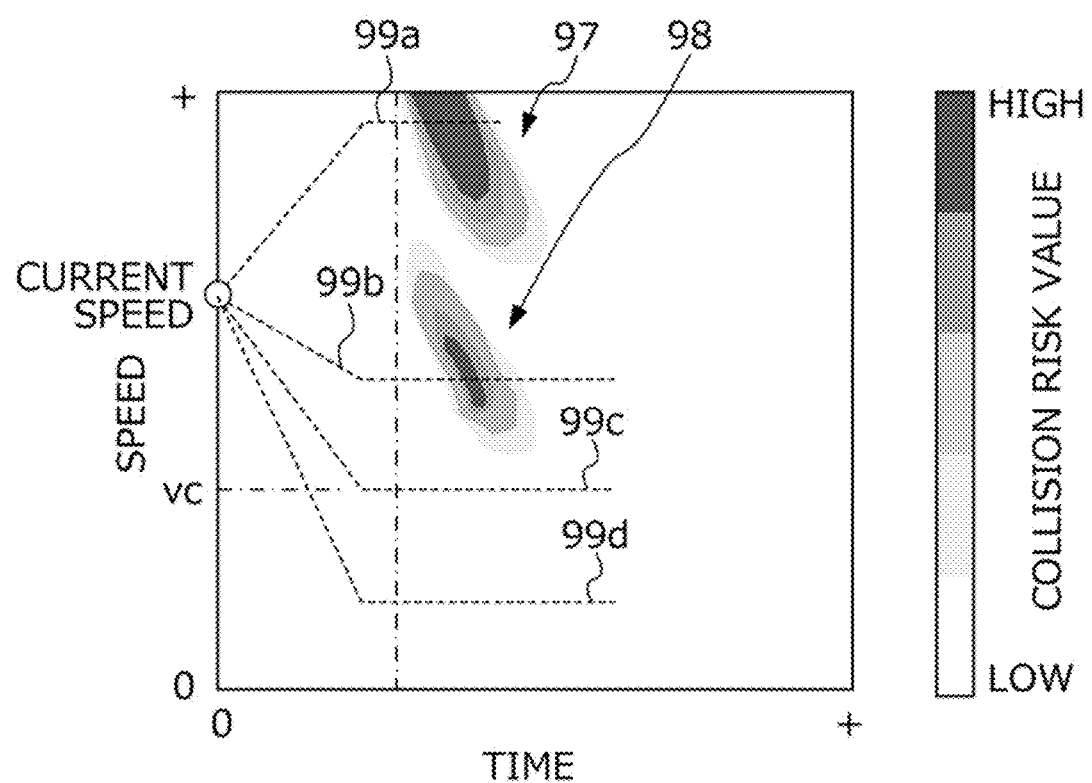
FIG. 6 is a view illustrating an example of a reference risk map for a first traffic participant defined as a prediction target under the example illustrated in FIG. 5, the map being generated by a reference risk map generator.

FIG. 6 is a view illustrating an example of a reference risk map for the first traffic participant 91 as the prediction target, the map being generated by the reference risk map generator 6241 under the example illustrated in FIG. 5. As illustrated in FIG. 6, the reference risk map is a three-dimensional map obtained by plotting collision risk values for the prediction target on a two-dimensional plane in which the horizontal axis represents time and the vertical axis represents a speed. Note that in FIG. 6, a current speed of the prediction target, or, a moving speed of the first traffic participant 91 at a start time point of the prediction processing is indicated by a white circle.

As illustrated in FIG. 6, two high risk regions 97 and 98 having a particularly large collision risk value exist in the reference risk map generated for the first traffic participant 91 as the prediction target under the example illustrated in FIG. 5. The high risk region 97 appearing in a high speed region in FIG. 6 indicates that the first traffic participant 91 is likely to collide with the third traffic participant 93 from behind, and the high risk region 98 appearing in a low speed region indicates that the first traffic participant 91 that has changed the lane is likely to contact the second traffic participant 92.

Thus, according to the reference risk map illustrated in FIG. 6, in a case where the prediction target accelerates according to a pattern as indicated by a broken line 99a, for example, it can be predicted that the prediction target is highly likely to collide with the third traffic participant 93 from behind. Further, according to the reference risk map illustrated in FIG. 6, in a case where the prediction target decelerates according to a pattern as indicated by a broken line 99b, for example, it can be predicted that the prediction target is highly likely to contact the second traffic participant 92. Still further, according to the reference risk map illustrated in FIG. 6, in a case where the prediction target decelerates at a deceleration greater than the deceleration indicated by the broken line 99b, as indicated by a broken line 99c, for example, it can be predicted that the prediction target is highly likely to be capable of avoiding collision with the third traffic participant 93 and the second traffic participant 92. This indicates that, in the example illustrated in FIG. 5, the first traffic participant 91 as the prediction target decelerates until the second traffic participant 92 overtakes the first traffic participant 91, and then changes the lane to overtake the third traffic participant 93, which makes it possible to avoid collision with the other traffic participants 92 and 93.

FIG. 7 is a view illustrating an example of a reference risk map for the second traffic participant 92 as the prediction target, the map being generated by the reference risk map generator 6241 under the example illustrated in FIG. 5. Note that in FIG. 7, a current speed of the prediction target, or, a moving speed of the second traffic participant 92 at a start time point of the prediction processing is indicated by a white circle.

As illustrated in FIG. 7, one high risk region 96 having a particularly large collision risk value exists in the reference risk map generated for the second traffic participant 92 as the prediction target under the example illustrated in FIG. 5. The high risk region 96 illustrated in FIG. 7 indicates that the second traffic participant 92 is likely to contact the first traffic participant 91 that has changed the lane. Note that the second traffic participant 92 is assumed to travel on the lane different from the lane of the third traffic participant 93, so that there is no possibility that the second traffic participant 92 will collide with the third traffic participant 93. Thus, the reference risk map for the second traffic participant 92 is different from the reference risk map for the first traffic participant 91 illustrated in FIG. 6, and includes no high risk region corresponding to the third traffic participant 93.

Returning to FIG. 4, the reference risk map generator 6241 generates reference risk maps as described above on the basis of the movement state information, the surrounding state information and the traffic environment information. Note that in this event, the reference risk map generator 6241 generates the reference risk map for the prediction target without using the confirmation state information for the driver of the prediction target. This means that the reference risk map generated by the reference risk map generator 6241 corresponds to a reference risk map generated for the prediction target by using only objective information (the movement state information, the surrounding state information, and the traffic environment information) from which subjectivity (the confirmation state information) by the driver of the prediction target is eliminated.

The recognition state estimation map generator 6242 generates a recognition state estimation map corresponding to a risk map viewed from the driver of the prediction target by correcting the reference risk map generated by the reference risk map generator 6241 on the basis of the confirmation state information of the driver of the prediction target.

As described with reference to FIGS. 6 and 7, the reference risk map generated by the reference risk map generator 6241 is a risk map generated by eliminating subjectivity by the driver of the prediction target. In other words, in the example illustrated in FIG. 6, the reference risk map for the first traffic participant 91 includes the two high risk regions 97 and 93, but the driver of the first traffic participant 91 cannot appropriately recognize the existence of the high risk regions 97 and 98 if the driver of the first traffic participant 91 cannot appropriately grasp the existence, positions, speeds of the traffic participants 92 and 93 around the first traffic participant 91. Thus, the recognition state estimation map generator 6242 generates a recognition state estimation map by correcting the reference risk map on the basis of the confirmation state information of the driver of the prediction target.

More specifically, the recognition state estimation map generator 6242 first estimate the level of recognition for each of the confirmation targets existing around the prediction target on the basis of the confirmation state information of the driver of the prediction target generated by the confirmation state information acquirer 623. Note that in the following description, a case will be described where the level of recognition for each of the confirmation targets is classified into three stages (high, medium, and low) but the present invention is not limited to this.

In a case where the number of confirmations with respect to a confirmation target is equal to or more than a predetermined first number of confirmations or in a case where the time period for confirmations with respect to the confirmation target is equal to or longer than a predetermined first time period for confirmations, the recognition state estimation map generator 6242 estimates that the driver appropriately recognizes the existence, position, speed and the like of the confirmation target, and estimates the level of recognition of the confirmation target by the driver as "high".

In a case where the number of confirmations with respect to a confirmation target is less than the above-described first number of confirmations and is equal to or more than a second number of confirmations set smaller than the first number of confirmations or in a case where the time period for confirmations with respect to the confirmation target is shorter than the above-described first time period for confirmations and is equal to or longer than a second time period for confirmations set shorter than the first time period for confirmations, the recognition state estimation map generator 6242 estimates that the driver estimates the existence of the confirmation target but may be unable to appropriately recognize the position, speed and the like of the confirmation target, and estimates the level of recognition of the confirmation target by the driver as "medium".

Further, in a case where the number of confirmations with respect to a confirmation target is less than the above-described second number of confirmations or in a case where the time period for confirmations with respect to the confirmation target is shorter than the above-described second time period for confirmations, the recognition state estimation map generator 6242 estimates that the driver may be unable to recognizes the existence of the confirmation target, and estimates the level of recognition of the confirmation target by the driver as "low".

Next, the recognition state estimation map generator 6242 generates a recognition state estimation map by correcting the reference risk map on the basis of the level of recognition by the driver estimated for each of the confirmation targets. More specifically, the recognition state estimation map generator 6242 generates a recognition state estimation map by eliminating the existence of a high risk region corresponding to the confirmation target having the level of recognition estimated as "low" among the plurality of high risk regions included in the reference risk map.

FIG. 3A is a view illustrating an example of a recognition state estimation map for the driver of a prediction target in a case where the first traffic participant 91 is defined as the prediction target, the level of recognition of the third traffic participant 93 by the driver of the prediction target is estimated as "high", and the level of recognition of the second traffic participant 92 is estimated as "low" in the example illustrated in FIG. 5. As is apparent from a comparison between the recognition state estimation map illustrated in FIG. 8A and the reference risk map illustrated in FIG. 6, the driver of the prediction target cannot recognize the existence of the second traffic participant 92, and therefore the recognition state estimation map for the driver of the prediction target (see FIG. BA) does not include the high risk region 98 illustrated in FIG. 6.

Further, the recognition state estimation map generator 6242 generates a recognition state estimation map by changing a position of a high risk region corresponding to the confirmation target having the level of recognition estimated as "medium" among the plurality of high risk regions included in the reference risk map to a distant position from the prediction target.

FIG. 8B is a view illustrating an example of a recognition state estimation map for the driver of a prediction target in a case where the first traffic participant 91 is defined as the prediction target, the level of recognition of the third traffic participant 93 by the driver of the prediction target is estimated as "high", and the level of recognition of the second traffic participant 92 is estimated as "medium" in the example illustrated in FIG. 5. As is apparent from a comparison between the recognition state estimation map illustrated in FIG. 8B and the reference risk map illustrated in FIG. 6, the position of the high risk region 98 in the recognition state estimation map in FIG. 8B is corrected to a later position along the time axis than the position of the high risk region 98 in the reference risk map in FIG. 6. In other words, it is considered that the driver of the prediction target recognizes the existence of the second traffic participant 92 but incorrectly recognizes that the second traffic participant 92 exists farther than the actual position. Thus, the recognition state estimation map generator 6242 corrects the position of the high risk region 98 to a later position along the time axis than that in the reference risk map.

Further, the recognition state estimation map generator 6242 generates a recognition state estimation map without correcting a high risk region corresponding to the confirmation target having the level of recognition estimated as "high" among the plurality of high risk regions included in the reference risk map. In other words, a recognition state estimation map for the driver of a prediction target in a case where the first traffic participant 91 is defined as the prediction target and the levels of recognition of the second traffic participant 92 and the third traffic participant 93 by the driver of the prediction target are estimated as "high" in the example illustrate in FIG. 5 is equal to the reference risk map illustrated in FIG. 6.

Returning to FIG. 4, the future moving speed calculator 6243 calculates a future moving speed which is a moving speed after a prediction period for the prediction target, on the basis of the recognition state estimation map for the driver of the prediction target generated by the recognition state estimation map generator 6242 according to the above-described procedure. More specifically, the future moving speed calculator 6243 predicts a future moving speed by assuming that in order to avoid risks estimated on the basis of the recognition state estimation map, the driver of the prediction target moves the prediction target at constant acceleration or deceleration from the current speed and then the speed of the prediction target transitions to a constant speed.

More specifically, the future moving speed calculator 6243 calculates a moving speed profile from a current time point to the predetermined period ahead so that an evaluation value shown in the following equation (1) becomes maximum. In the following, the moving speed profile calculated by the future moving speed calculator 6243 is referred to as a "future moving speed profile". Moreover, the future moving speed calculator 6243 predicts a future moving speed after a predicted period on the basis of the future moving speed profile. In the following equation (1), a "maximum risk value" is a maximum value of the collision risk value calculated by searching the recognition state estimation map on the basis of the moving speed profile. In the following equation (1), a "moving period" is a period required to transition from the current time point to the constant speed in the moving speed profile. Further, in the following equation (1), "acceleration or deceleration" is an absolute value of the acceleration of the prediction target until the speed of the prediction target transitions from the current time point to the constant speed in the moving speed profile. Further, in the following equation (1), "a" and "b" each are positive coefficients.

$$\text{Evaluation value} = 1/(\text{Maximum risk value} + a \times \text{Moving period} + b \times \text{Acceleration or deceleration}) \quad (1)$$

Since the driver of the prediction target attempts to avoid the risks recognized by himself/herself as much as possible, the evaluation value increases as the collision risk value calculated on the basis of the recognition state estimation map is reduced as shown in the above equation. Since the driver of the prediction target is likely to attempt to avoid the risks under the least possible acceleration or deceleration, the evaluation value increases as the acceleration or deceleration is reduced as shown in the above equation. Further, since the driver of the prediction target is likely to attempt to avoid the risks as quickly as possible, the evaluation value increases as the moving period required for a transition to the constant speed is reduced as shown in the above equation. Thus, the future moving speed calculator 6243 calculates the future moving speed profile or the future moving speed so that both of the collision risk value and the acceleration or deceleration of the prediction target to be calculated on the basis of the recognition state estimation map are reduced and the moving period required for a transition to the constant speed is reduced.

Here, a specific example of the evaluation value will be described using the recognition state estimation map illustrated in FIG. 6 for an example. In FIG. 6, both of the maximum risk values calculated under the moving speed profiles indicated by the broken lines 99*a* and 99*c* are greater than the maximum risk values calculated under the moving speed profiles indicated by the broken lines 99*c* and 99*d*. Further, the acceleration or deceleration in the moving speed profile indicated by the broken line 99*a* is greater than the acceleration or deceleration in the moving speed profile indicated by the broken line 99*b*. Further, the acceleration or deceleration in the moving speed profile indicated by the broken line 99*d* is greater than the acceleration or deceleration in the moving speed profile indicated by the broken line 99*c*. Thus, in the example illustrated in FIG. 6, the evaluation value is greater in order of the broken lines 99*a*, 99*b*, 99*d*, and 99*c*. Thus, in a case where the recognition state estimation map is equal to the reference risk map illustrated in FIG. 6, that is, in a case where the driver of the first traffic participant 91 as the prediction target appropriately recognizes the second traffic participant 92 and the third traffic participant 93 existing around the first traffic participant 91, the future moving speed calculator 6243 calculates the future moving speed on the basis of the future moving speed profile indicated by the broken line 99*c* in which the evaluation value becomes maximum. Thus, the future moving speed is "vc" under the recognition state estimation map illustrated in FIG. 6.

Further, in a case where the recognition state estimation map is equal to the recognition state estimation map illustrated in FIG. 8A, that is, in a case where the driver of the first traffic participant 91 as the prediction target cannot recognize the existence of the second traffic participant 92, the future moving speed calculator 6243 determines the broken line 99*e* as the future moving speed profile in which the evaluation value becomes maximum, and calculates the future moving speed on the basis of the broken line 99*e*. Thus, the future moving speed is "ve" under the recognition state estimation map illustrated in FIG. 8A.

Further, in a case where the recognition state estimation map is equal to the recognition state estimation map illustrated in FIG. 8B, that is, in a case where the driver of the first traffic participant 91 as the prediction target cannot appropriately recognize the position and speed of the second traffic participant 92, the future moving speed calculator 6243 determines the broken line 99*f* as the future moving speed profile in which the evaluation value becomes maximum, and calculates the future moving speed on the basis of the broken line 99*f*. Thus, the future moving speed is "vf" under the recognition state estimation map illustrated in FIG. 8B.

Here, the future moving speed "ve" predicted under the recognition state estimation map in FIG. 8A is greater than each of the future moving speed "vf" predicted under the recognition state estimation map in FIG. 8B and the future moving speed "vc" predicted under the recognition state estimation map in FIG. 6. Further, the future moving speed "vf" predicted under the recognition state estimation map in FIG. 8B is greater than the future moving speed "vc" predicted under the recognition state estimation map in FIG. 6. Further, in a case where the number of confirmations (or the time period for confirmations) with respect to the second traffic participant 92 by the driver of the first traffic participant 91 as the prediction target is less than the second number of confirmations (or the second time period for confirmations), the recognition state estimation map generator 6242 generates the recognition state estimation map illustrated in FIG. 8A, and in a case where the number of confirmations (or the time period for confirmations) is equal to or more than the second number of confirmations (or the second time period for confirmations) and is less than the first number of confirmations (or the first time period for confirmations), the recognition state estimation map generator 6242 generates the recognition state estimation map as illustrated in FIG. 8B. Thus, the moving speed predictor 624 tends to predict the future moving speed more highly in a case where the number of confirmations (or the time period for confirmations) of the traffic participant around the prediction target by the driver of the prediction target is less than the second number of confirmations for the second time period for confirmations) than in a case where the number of confirmations (or the time period for confirmations) is equal to or more than the second number of confirmations (or the second time period for confirmations). Further, the moving speed predictor 624 tends to predict the future moving speed more highly in a case where the number of confirmations (or the time period for confirmations) of the traffic participant around the prediction target by the driver of the prediction target is less than the first number of confirmations (or the first time period for confirmations) than in a case where the number of confirmations for the time period for confirmations) is equal to or more than the first number of confirmations (or the first time period for confirmations).

Returning to FIG. 3, the collision predictor 625 predicts whether or not a collision will occur in the future of the prediction target on the basis of the movement state information, the surrounding state information, the traffic environment information, the future moving speed profile predicted by the moving speed predictor 624, and the like. The collision predictor 625 calculates the collision risk value by searching the reference risk map for the prediction target, on the basis of the future moving speed profile predicted by the moving speed predictor 624, for example. Further, the moving speed predictor 624 predicts that the prediction target is highly likely to collide in a case where the collision risk value calculated on the basis of the future moving speed profile is equal to or greater than a predetermined collision determination threshold, and predicts that the prediction target is unlikely to collide in a case where the collision risk value is less than the collision determination threshold.

More specifically, for example, both of the moving speed profile indicated by the broken line 99e in FIG. 8A and the moving speed profile indicated by the broken line 99f in FIG. 8B intersect the high risk region 98 in the reference risk map illustrated in FIG. 6. Thus, the collision predictor 625 predicts that the first traffic participant 91 as the prediction target is highly likely to collide with the second traffic participant 92 in a case where the future moving speed profiles indicated by the broken lines 99e and 99f are calculated by the moving speed predictor 624.

In a case where it is predicted by the collision predictor 625 that the prediction target is highly likely to collide, the support action information generator 626 generates support action information regarding action for avoiding a collision of the prediction target or action for reducing damage due to collision on the basis of the movement state information, the surrounding state information, and the traffic environment information. The support action information generator 626 generates the support action information on the basis of the reference risk map generated by the moving speed predictor 624, for example. More specifically, the support action information generator 626 generates, as the support action information, a moving speed profile from the current time point to the predetermined period ahead so that an evaluation valve calculated on the basis of the reference risk map (see the above-described equation (1)) becomes maximum. More specifically, the support action information generator 626 generates, as the support action information, a moving speed profile indicated by the broken line 99c under the reference risk map illustrated in FIG. 6, for example.

In a case where it is predicted by the collision predictor 625 of the predictor 62 that the prediction target is highly likely to collide, the coordination support information notifier 65 generates information regarding the prediction result of the collision predictor 625 (that is, the collision risk value, the future moving speed, the future moving speed profile, the reference risk map, the recognition state estimation map, and the like), and coordination support information including the support action information generated by the support action information generator 626, and the like, and transmits the generated information to the on-board devices 20, 30 moving along with the traffic participant determined as the prediction target.

As described above, the on-board devices 20, 30 include on-board notification device 22, 32 causing the HMI to operate in an aspect determined on the basis of the coordination support information transmitted from the coordination support information notifier 65. Thus, the on-board notification devices 22, 32 having received the coordination support information notifies the driver of the information regarding the prediction result of the collision predictor 625 by at least one selected from the image and sound, which can cause the driver to recognize the existence of the predicted risks. Further, the on-board notification device 22, 32 having received the coordination support information notifies the driver of the information generated to perform a driving operation according to the support action information by at least one selected from the image and sound, which can encourage the driver to perform the driving operation for avoiding the predicted collision or reducing the damage.

FIG. 9 is an example of an image displayed by the on-board notification device 22, 32. More specifically, FIG. 9 is an example of an image displayed when the moving speed profile indicated by the dashed-line in the risk map shown in FIG. 6 is generated as the support action information.

As shown in FIG. 9, the on-board notification devices 22, 32 may display an image generated by plotting a circle 100 indicating the current speed and a moving speed profile 101 transmitted as support action information on a risk map. In this case, the on-board notification devices 22, 32 may highlight in red, for example, area where the collision risk value on the risk map is higher than the collision determination threshold (i.e., the high-risk areas 97, 98 in FIG. 6) so that the driver viewing the image can quickly recognize the high-risk areas, as shown by areas 102, 103 in FIG. 9. Although the figures are not shown, the on-board notification devices 22, 32 may also display an icon warning of a high-risk area on a map image displayed by navigation device. By viewing such an image, the driver of the prediction target can recognize the existence of a collision risk with surrounding traffic participants and the procedures for driving operations to avoid or reduce this collision risk.

Returning to FIG. 3, the on-board devices 20, 30 include an on-board driving support device 21, 31 that automatically controls the behavior of the vehicle on the basis of the coordination support information transmitted from the coordination support information notifier 65. Thus, the on-board driving support device 21, 31 having received the coordination support information automatically controls the behavior of the vehicle on the basis of the support action information, which makes it possible to avoid the predicted collision or reduce the damage due to the predicted collision.

FIG. 10 is a flowchart illustrating specific procedure of traffic safety support processing for supporting safe traffic of the traffic participants in the target traffic area by the traffic management server 6. Each step indicated in the flowchart in FIG. 10 is implemented by a computer program stored in a storage medium which is not illustrated being executed by the traffic management server 6.

First, in step ST1, the traffic management server 6 determines the monitoring area among the target traffic area, and the processing transitions to step ST2. In step ST2, the traffic management server 6 recognizes a plurality of traffic participants existing in the monitoring area and further determines a prediction target among the plurality of traffic participants, and the processing transitions to step ST3.

In step ST3, the traffic management server 6 acquires movement state information of the prediction target, and the processing transitions to step ST4. In step ST4, the traffic management server 6 acquires surrounding state information of the traffic participants around the prediction target in the monitoring area, and the processing transitions to step ST5. In step ST5, the traffic management server 6 acquires traffic environment information of the surroundings of the prediction target in the monitoring area, and the processing transitions to step ST6. In step ST6, the traffic management server 6 acquires confirmation state information of a driver of the prediction target, and the processing transitions to step ST7.

In step ST7, the traffic management server 6 predicts a future moving speed of the prediction target on the basis of the movement state information, the surrounding state information, the traffic environment information, and the confirmation state information, and the processing transitions to step ST8. As described above, in step ST7, the traffic management server 6 generates a reference risk map for the prediction target on the basis of the movement state information, the surrounding state information, and the traffic environment information, generates a recognition state estimation map by correcting the reference risk map on the basis of the confirmation state information, and further predicts a future moving speed of the prediction target on the basis of the recognition state estimation map.

In step ST8, the traffic management server 6 predicts whether or not a collision will occur in the future of the prediction target on the basis of the movement state information, the surrounding state information, the traffic environment information, and the future moving speed, and the processing transitions to step ST9.

In step ST9, the traffic management server 6 generates support action information regarding action for avoiding a collision of the prediction target or reducing the damage in a case where it is predicted in step ST8 that the prediction target is highly likely to collide, and the processing transitions to step ST10.

In step ST10, the traffic management server 6 transmits, to the prediction target, the information regarding the prediction results in steps ST7 to ST8 and the coordination support information including the support action information, and the processing returns to step ST1.

While one embodiment of the present invention has been described above, the present invention is not limited to this. Detailed configurations may be changed as appropriate within a scope of gist of the present invention. For example, in the above-described embodiment, a case has been described where the predictor 62 that predicts the future of the prediction target which is a moving body in the monitoring area is provided in the traffic management server 6 connected so as to be able to perform communication with the prediction target, but the present invention is not limited to this. The predictor may include on-board devices 20, 30 moving along with the support target. In this case, although the information amount of the movement state information, the surrounding state information, the traffic environment information and the like that can be acquired by the predictor is smaller than the information amount that can be acquired by the traffic management server, there is an advantage that the delay through the communication is small.

EXPLANATION OF REFERENCE NUMERALS

1 Traffic safety support system
2 Four-wheeled vehicle (moving body, traffic participant)
20 On-board devices
21 On-board driving support device
22 On-board notification device
3 Motorcycle (moving body, traffic participant)
30 On-board devices
31 On-board driving support device
32 On-board notification device
6 Traffic management server
60 Target traffic area recognizer
61 Driving subject information acquirer
62 Predictor (moving body predictor)
620 Movement state information acquirer
621 Surrounding state information acquirer
622 Traffic environment information acquirer
623 Confirmation state information acquirer
624 Moving speed predictor
6241 Reference risk map generator
6242 Recognition state estimation map generator
6243 Future moving speed calculator
625 Collision predictor
626 Support action information generator
65 Coordination support information notifier (support information notifier)
9 Target traffic area
90 Monitoring area
91 First traffic participant
92 Second traffic participant
93 Third traffic participant

What is claimed is:

1. A moving body prediction device predicting, when a moving body moving in a traffic area is defined as a prediction target, a future of the prediction target in the traffic area, comprising:
  a movement state information acquirer configured to acquire movement state information regarding a movement state of the prediction target;
  a surrounding state information acquirer configured to acquire surrounding state information regarding movement states of traffic participants around the prediction target in the traffic area;
  a confirmation state information acquirer configured to acquire confirmation state information regarding a surrounding confirmation state of a driver of the prediction target;
  a moving speed predictor configured to predict a future moving speed of the prediction target on a basis of the movement state information, the surrounding state information, and the confirmation state information; and a collision predictor configured to predict whether or not a collision will occur in a future of the prediction target on the basis of the movement state information, the surrounding state information, and the future moving speed.

2. The moving body prediction device according to claim 1, wherein
the confirmation state information acquirer generates the confirmation state information on the basis of face image data of the driver captured by a camera provided in the prediction target and the surrounding state information.

3. The moving body prediction device according to claim 2, wherein
the confirmation state information includes the number of surrounding confirmations by the driver, and
the moving speed predictor predicts the future moving speed more highly in a case where the number of surrounding confirmations is less than a threshold of the number of confirmations than in a case where the number of surrounding confirmations is equal to or greater than the threshold of the number of confirmations.

4. The moving body prediction device according to claim 3, wherein
the confirmation state information acquirer calculates a direction of a line of sight of the driver on the basis of the face image data and counts the number of surrounding confirmations on condition that the direction of the line of sight is within a range determined on the basis of the surrounding state information.

5. The moving body prediction device according to claim 2, wherein
the confirmation state information includes a time period for surrounding confirmations by the driver, and
the moving speed predictor predicts the future moving speed more highly in a case where the time period for surrounding confirmations is less than a threshold of a time period for confirmations than in a case where the time period for surrounding confirmations is equal to or greater than the threshold of the time period for confirmations.

6. The moving body prediction device according to claim 5, wherein
the confirmation state information acquirer calculates a direction of a line of sight of the driver on the basis of the face image data and counts the time period for surrounding confirmations on condition that the direction of the line of sight is within a range determined on the basis of the surrounding state information.

7. The moving body prediction device according to claim 2, wherein
the confirmation state information acquirer generates the confirmation state information on the basis of biological information of the driver detected by a biological information sensor provided in the prediction target.

8. The moving body prediction device according to claim 1, wherein
the moving speed predictor includes:
a reference risk map generator configured to generate a reference risk map that associates a moving speed of the prediction target with a risk value in the future of the prediction target on the basis of the movement state information and the surrounding state information;

a recognition state estimation map generator configured to generate a recognition state estimation map by correcting the reference risk map on the basis of the confirmation state information; and a future moving speed calculator configured to calculate the future moving speed on the basis of the recognition state estimation map.

9. The moving body prediction device according to claim 8, wherein
the future moving speed calculator calculates the future moving speed so that both of a risk value and acceleration or deceleration of the prediction target to be calculated on the basis of the recognition state estimation map are reduced.

10. A traffic safety support system, comprising:
on-board devices that move along with the prediction target; and
a traffic management server capable of communicating with the on-board devices,
wherein the traffic management server includes the moving body prediction device according to claim 1 and a support information notifier configured to transmit, to the on-board devices, support information including information regarding a prediction result of the collision predictor in a case where it is predicted by the collision predictor that the prediction target will collide, and
the on-board devices include an on-board notification device configured to notify the driver of the information generated on a basis of the support information by at least one selected from an image and sound.

11. The traffic safety support system according to claim 10, wherein
the moving body prediction device further includes a support action information generator configured to generate support action information regarding action for avoiding a collision or action for reducing damage due to the collision on the basis of the movement state information and the surrounding state information,
the support information notifier transmits, to the on-board devices, the information regarding the prediction result and the support information including the support action information, and
the on-board notification device notifies the driver of the information, by at least one selected from an image and sound, generated so that the driver performs a driving operation according to the support action information.

12. A traffic safety support system, comprising:
on-board devices that move along with the prediction target; and
a traffic management server capable of communicating with the on-board devices,
wherein the traffic management server includes the moving body prediction device according to claim 1 and a support information notifier configured to transmit, to the on-board devices, support information including information regarding a prediction result of the collision predictor in a case where it is predicted by the collision predictor that the prediction target will collide, and
the on-board devices include an on-board driving support device configured to automatically control behavior of the prediction target on a basis of the support information.

13. The traffic safety support system according to claim 12, wherein the moving body prediction device further includes a support action information generator configured to generate support action information regarding action for avoiding a collision or action for reducing damage due to the collision on the basis of the movement state information and the surrounding state information, the support information notifier transmits, to the on-board devices, the information regarding the prediction result and the support information including the support action information, and the on-board driving support device automatically controls behavior of the prediction target on the basis of the support action information.

14. A storage medium storing a computer program for a computer that predicts, when a moving body moving in a traffic area is defined as a prediction target, a future of the prediction target in the traffic area, the computer program comprising the steps of:

acquiring movement state information regarding a movement state of the prediction target;

acquiring surrounding state information regarding movement states of traffic participants around the prediction target in the traffic area;

acquiring confirmation state information regarding a surrounding confirmation state of a driver of the prediction target;

predicting a future moving speed of the prediction target on a basis of the movement state information, the surrounding state information, and the confirmation state information; and predicting whether or not a collision will occur in a future of the prediction target on the basis of the movement state information, the surrounding state information, and the future moving speed.

* * * * *